United States Patent
Wang et al.

(10) Patent No.: US 11,032,480 B2
(45) Date of Patent: Jun. 8, 2021

(54) VIDEO ZOOM CONTROLS BASED ON RECEIVED INFORMATION

(71) Applicant: HEWLETT-PACKARD DEVELOPMENT COMPANY, L.P., Houston, TX (US)

(72) Inventors: Henry Wang, Houston, TX (US); Kent E. Biggs, Houston, TX (US); Charles J. Stancil, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/076,554

(22) PCT Filed: Jan. 31, 2017

(86) PCT No.: PCT/US2017/015707
§ 371 (c)(1),
(2) Date: Aug. 8, 2018

(87) PCT Pub. No.: WO2018/143909
PCT Pub. Date: Aug. 9, 2018

(65) Prior Publication Data
US 2019/0052812 A1    Feb. 14, 2019

(51) Int. Cl.
*H04N 5/232*    (2006.01)
*H04N 7/15*    (2006.01)
(Continued)

(52) U.S. Cl.
CPC ....... *H04N 5/23296* (2013.01); *H04N 5/2254* (2013.01); *H04N 5/30* (2013.01);
(Continued)

(58) Field of Classification Search
CPC .... H04N 5/23296; H04N 5/2254; H04N 5/30; H04N 7/152
(Continued)

(56) References Cited

U.S. PATENT DOCUMENTS

| 6,970,181 B1 | 11/2005 | Fadel |
| 8,456,503 B2 | 6/2013 | Hoelsaeter |

(Continued)

FOREIGN PATENT DOCUMENTS

| CN | 102244807 | 11/2011 |
| CN | 104364825 | 2/2015 |
| CN | 106127203 | 11/2016 |

OTHER PUBLICATIONS

"Altia Systems to Showcase the PanaCast 2 Huddle Room Solution at InfoComm", Altia Systems, Business Wire, Retrieve from internet—https://www.businesswire.com/news/home/20160607005680/en/Altia-Systems-Showcase-PanaCast-2-Huddle-Room, 2016, 4 Pages.
(Continued)

*Primary Examiner* — Sinh Tran
*Assistant Examiner* — Zhenzhen Wu
(74) *Attorney, Agent, or Firm* — Trop Pruner & Hu PC

(57) ABSTRACT

In some examples, information is sensed by an optical sensor responsive to light from a marker arranged to indicate a boundary of a physical user collaborative area to receive user-input marks during a video conference session, where the marker is distinct from the physical user collaborative area. Based on the received information, the boundary of the physical user collaborative area is determined. Based on the determined boundary, a video zoom into the physical user collaborative area during the video conference session is controlled.

17 Claims, 5 Drawing Sheets

(51) Int. Cl.
  *H04N 21/4545* (2011.01)
  *H04N 21/4223* (2011.01)
  *H04N 21/44* (2011.01)
  *H04N 7/14* (2006.01)
  *H04N 5/225* (2006.01)
  *H04N 5/30* (2006.01)

(52) U.S. Cl.
  CPC ............. *H04N 7/147* (2013.01); *H04N 7/152* (2013.01); *H04N 21/4223* (2013.01); *H04N 21/44008* (2013.01); *H04N 21/45455* (2013.01)

(58) Field of Classification Search
  USPC ...................................................... 348/222.1
  See application file for complete search history.

(56) References Cited

U.S. PATENT DOCUMENTS

| | | | |
|---|---|---|---|
| 9,065,974 B2 | 6/2015 | Halavy | |
| 9,154,737 B2 | 10/2015 | Thomas | |
| 9,307,192 B2 | 4/2016 | Oyman | |
| 9,438,858 B1 | 9/2016 | Evans et al. | |
| 10,403,050 B1* | 9/2019 | Beall | |
| 2006/0077258 A1 | 4/2006 | Allen et al. | |
| 2006/0092178 A1 | 5/2006 | Tanguay et al. | |
| 2006/0132467 A1 | 6/2006 | Saund et al. | |
| 2009/0079812 A1 | 3/2009 | Crenshaw et al. | |
| 2011/0141222 A1 | 6/2011 | Hoelsaeter | |
| 2011/0285809 A1 | 11/2011 | Feng et al. | |
| 2011/0299832 A1* | 12/2011 | Butcher | H04N 21/41407 386/248 |
| 2012/0229425 A1* | 9/2012 | Barrus | G06F 21/32 345/179 |
| 2012/0229589 A1* | 9/2012 | Barrus | H04N 7/147 348/14.08 |
| 2013/0242137 A1* | 9/2013 | Kirkland | G03B 37/02 348/231.99 |
| 2013/0265382 A1* | 10/2013 | Guleryuz | H04N 7/15 348/14.08 |
| 2015/0033146 A1 | 1/2015 | Wu et al. | |
| 2015/0262013 A1 | 9/2015 | Yamashita et al. | |
| 2016/0041724 A1 | 2/2016 | Kirkby et al. | |
| 2016/0100099 A1 | 4/2016 | Oyman et al. | |
| 2016/0127617 A1* | 5/2016 | Partouche | H04N 5/232 348/207.99 |
| 2018/0314323 A1* | 11/2018 | Mikhailov | G06F 3/012 |

OTHER PUBLICATIONS

"PanaCast 2 Huddle Room Installation and Use", Applications Brief, Panacast, Retrieved from Internet—www.getpanacast.com, 2015, 2 Pages.

Liao et al., "Automatic Zooming Mechanism for Capturing Object Image Using High Definition Fixed Camera", IEEE, Retrieved from Internet—http://ieeexplore.ieee.org/document/7423424, 2016, 3 Pages.

* cited by examiner

VIDEO ZOOM CONTROLS BASED ON RECEIVED INFORMATION

BACKGROUND

A video conference session can be formed among participants located at different locations, which can be geographically spread apart at different locations within a city, or across different cities, states, or countries, or even in different rooms of an office space or campus. In a video conference session, video conference equipment is located at each location, where the video conference equipment includes a camera to capture a video of the participant(s) at each location, as well as a display device to display a video of participant(s) at a remote location (or remote locations).

BRIEF DESCRIPTION OF THE DRAWINGS

Some implementations of the present disclosure are described with respect to the following figures.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

During a video conference session, cameras at respective locations of the video conference session are usually focused on the human participants of the video conference session at the respective locations. In some cases, a participant at a first location may wish to present information on a physical user collaborative area, such as a whiteboard, a chalk board, a piece of paper, or any other physical area in which a user can input marks, such as by using a pen, marker, and so forth. In some cases, the physical user collaborative area can be a digital board or touch-sensitive display device in which a user can use a digital pen, a stylus, a user's finger, and so forth, to make markings on the digital board or touch-sensitive display device.

It can be difficult for remote participants (at locations that are remote from the first location) to view the content on the physical user collaborative area at the first location. In some examples, manual intervention by a local participant at the first location is performed to physically move (e.g., pan and tilt) the camera at the first location to focus on the physical user collaborative area, and to manually zoom the camera into the physical user collaborative area. However, once the camera at the first location is adjusted such that it is focused on and zoomed into the physical user collaborative area at the first location, the camera may not capture the local participant(s) at the first location, such that the remote participant(s) would no longer be able to view the local participant(s).

In accordance with some implementations of the present disclosure, automated techniques or mechanisms are provided to allow for a system to automatically identify a boundary of a physical user collaborative area at a first location during a video conference session, and to zoom into the physical user collaborative area during the video conference session. The video of the physical user collaborative area can be displayed as a separate video feed (in addition to the video feed of the participant(s) at the first location). In such examples, the video of the physical user collaborative area at the first location and the video of the participant(s) at the first location can be simultaneously displayed by video conference equipment at another location. Alternatively, the video of the physical user collaborative area and the video of the participant(s) are displayed at different times, with the remote participants selecting which to display at any given time.

Figure 1:
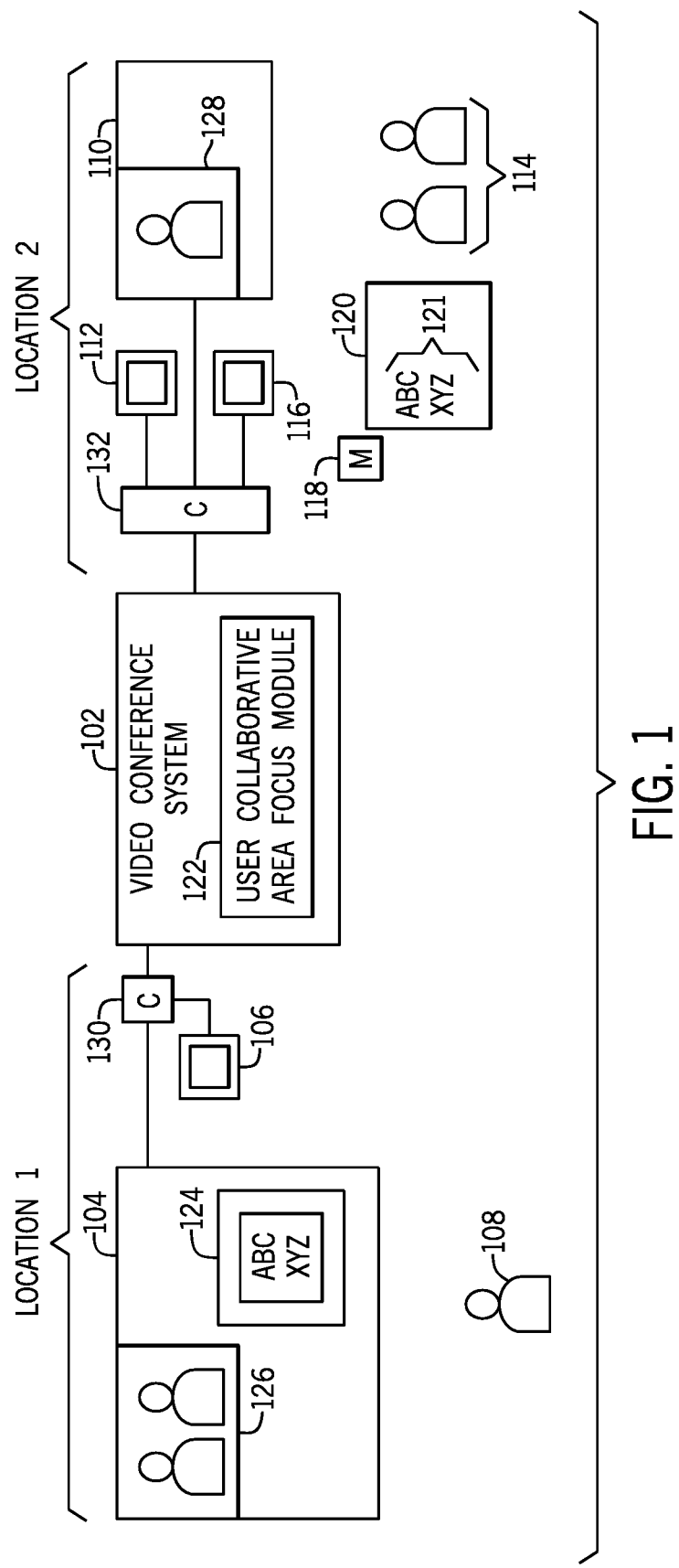
FIG. 1 is a block diagram of a video conference arrangement in which a video conference session can be established among participants at multiple locations, in accordance with some examples.

FIG. 1 shows an example arrangement that includes a video conference system 102 that supports a video conference between participants at multiple locations (location 1 and location 2 shown in FIG. 1). The video conference system 102 can be implemented as a computer or as a distributed arrangement of computers that execute instructions to support video conference sessions. A video conference session can refer to a communication session in which video images captured at endpoints of the communication session and other media (e.g., audio, text, etc.) are exchanged over a network between or among the endpoints.

The video conference system 102 is coupled over a network to video conference equipment at respective locations, where a video conference equipment at each location can include a display device to display video of remote locations, and a camera to capture a video of a local location.

In the example of FIG. 1, it is assumed that a video conference session involves participants at two locations (location 1 and location 2). In other examples, a video conference session can involve participants at more than two locations. The video conference equipment at location 1 includes a display device 104 and a camera 106, which can capture a video of a human participant 108 at location 1. At location 2, the video conference equipment includes a display device 110 and a camera 112 to capture a video of human participants 114 at location 2. The display device 104 at location 1 is able to display a video 126 of participants 114 at location 2 (as captured by the camera 112 at location 2). The display device 110 at location 2 is able to display a video 128 of a participant 108 at location 1 (as captured by the camera 106 at location 1).

Note that the video conference equipment at each location can also include a computer (or computers) that can perform the control of display of videos at the respective display devices, and the communication with the video conference system 102. A computer 130 at location 1 is communicatively coupled to the display device 104 and the camera 106, and a computer 132 at location 2 is communicatively coupled to the camera 112, the display device 110, and an optical sensor 116 (discussed below).

In accordance with some implementations of the present disclosure, the video conference equipment at location 2 further includes the optical sensor 116 that is able to sense light from a marker 118 that is at a specified location with respect to a physical user collaborative area 120, in which a user can input marks 121 such as during a video conference session. The marker 118 can include a light emitter or a light reflector. A light emitter includes a light source that can generate a light. A light reflector reflects light produced from another light source.

The marker 118 is distinct from the physical user collaborative area 120. For example, the marker 118 is physically separate from the physical user collaborative area 120, although the marker 118 can be attached to the physical user collaborative area 120. More generally, the marker 118 is distinct from the physical user collaborative area 120 if the marker 118 is not part of the physical user collaborative area 120. For example, the marker 118 is not written on or printed on to the physical user collaborative area 120.

Although just one marker 118 is depicted in FIG. 1, it is noted that in further examples, there can be more than one marker 118. For example, there can be four markers provided at the four corners of the physical user collaborative area 120, in examples where the physical user collaborative area 120 is generally rectangular in shape. For physical user collaborative areas of other shapes, different numbers of markers can be deployed at respective different locations along the boundaries of such other physical user collaborative areas.

In some examples, the optical sensor 116 that captures light from the marker 118 can include an infrared (IR) optical sensor to capture IR light. In other examples, the optical sensor 116 can capture light in the visible spectrum. Although FIG. 1 shows the optical sensor 116 as being separate from the camera 112 at location 2, it is noted that in other examples, the camera 112 can perform both the capture of video of participant(s) and other objects, as well as detect the marker 118.

Measurement information acquired by the optical sensor 116, in response to light from the marker 118, is provided by the optical sensor 116 to a user collaborative area focus module 122 that includes machine-readable instructions executable in the video conference system 102. The information received by the user collaborative area focus module 122 from the optical sensor 116 can indicate the boundary of the physical user collaborative area 120 at location 2.

Based on the indicated boundary of the physical user collaborative area 120, the user collaborative area focus module 122 is able to control the camera 112 to perform a video zoom into the physical user collaborative area 120. The video zoom involves the camera focusing into a region that includes the physical user collaborative area 120, such that a video of the region including the physical user collaborative area 120 is enlarged. The zoomed video of the physical user collaborative area 120 is communicated by the video conference system 102 to the display device 104 at location 1, which displays the zoomed video 124 of the physical user collaborative area 120.

In the example of FIG. 1, it is assumed that the display device 104 is able to simultaneously display both the video 126 of the participants 114 at location 2, and the zoomed video 124 of the physical user collaborative area 120. In other examples, the participant 108 at location 1 can select which of the video 126 of the participants 114 at location 2, and the zoomed video 124 of the physical user collaborative area 120 to display at any given time.

The video 126 of the participants 114 at location 2 can be displayed in a first window by the display device 104, and the video 124 of the physical user collaborative area 120 is displayed in a second window by the display device 104. The first and second windows can be simultaneously displayed, or can be displayed one at a time based on user or program selection.

Figure 2:
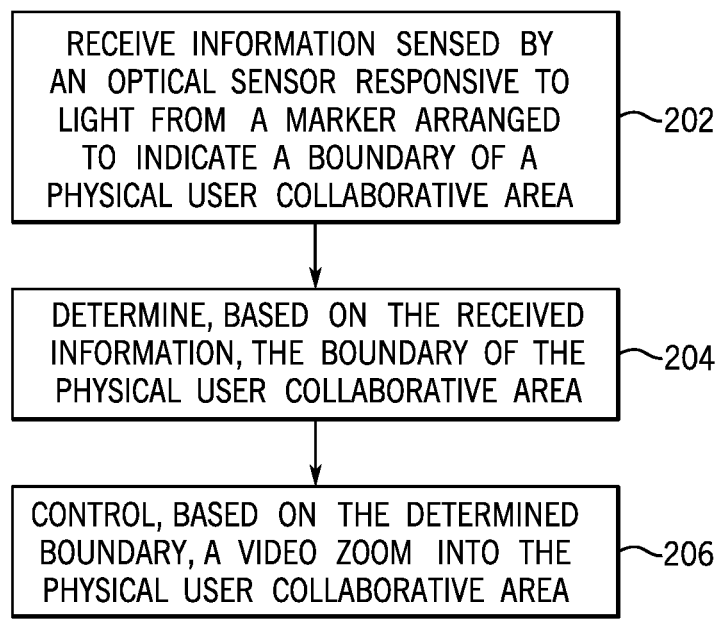
FIG. 2 is a flow diagram of a process according to some examples.

FIG. 2 is a flow diagram of an example process that can be performed by the user collaborative area focus module 122 of FIG. 1. In FIG. 2, the process includes receiving (at 202) information sensed by the optical sensor 116 responsive to light from the marker 118 arranged to indicate a boundary of the physical user collaborative area 120. The marker 118 is arranged to indicated the boundary of the physical user collaborative area 120 if the marker 118 is located at a position that is on or near (to within some specified distance) of the boundary of the physical user collaborative area 120.

The process further includes determining (at 204), based on the received information, the boundary of the physical user collaborative area 120. In examples where there is just one marker 118, the user collaborative area focus module 122 is able to use information regarding a shape of the physical user collaborative area 120 (e.g., a rectangular shape, a circular shape, an oval shape, a triangular shape, etc.) to determine where the physical user collaborative area 120 is based on the location of the marker 118. The information regarding the shape of the physical user collaborative area 120 can be entered by a user, an administrator, by a program, and so forth.

In examples where there are multiple markers 118, the user collaborative area focus module 122 is able to determine the boundary of the physical user collaborative area 120 from the locations of the multiple markers 118. For example, if the physical user collaborative area 120 is generally rectangular in shape, and there are four markers 118 at the corners of the physical user collaborative area 120, then the user collaborative area focus module 122 is able to determine the boundary of the physical user collaborative area 120 based on the determined corners. Similarly, if the physical user collaborative area 120 is generally triangular in shape, and there are three markers 118 at the corners of the triangle, then the user collaborative area focus module 122 can determine boundary based on the determined corners.

In addition, the process includes controlling (at 206), based on the determined boundary, a video zoom into the physical user collaborative area 120, so that a remote participant can more readily see the content of the physical user collaborative area 120. Controlling the video zoom into the physical user collaborative area 120 involves controlling the camera 112 (or a different camera) at location 2 to focus into a region that includes the physical user collaborative area 120, such that an enlarged view of the physical user collaborative area 120 is possible at location 1. In some cases, controlling the video zoom into the physical user collaborative area 120 can also involving panning and tilting the camera 112 (or a different camera) to be directed in a direction towards the physical user collaborative area 120.

Figure 3:
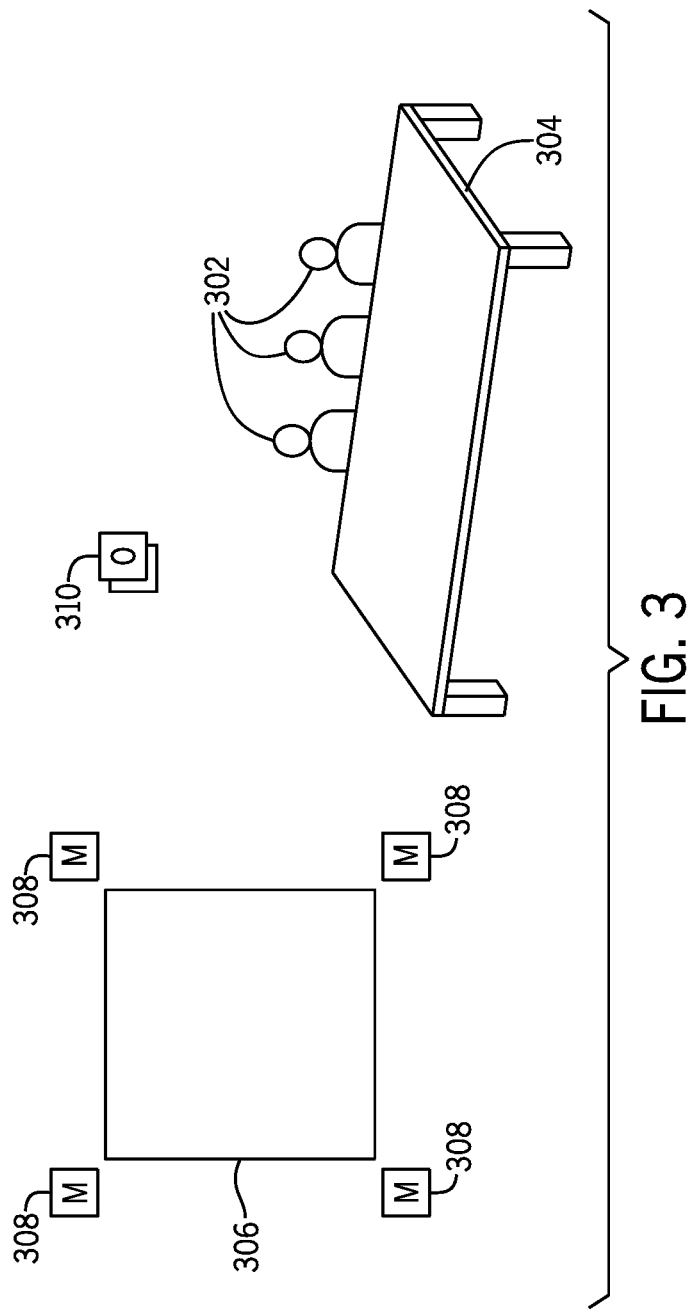
FIG. 3 illustrates an example arrangement at a location of a video conference session, according to further examples.

FIG. 3 is a schematic diagram that shows a location of a video conference session, where the location includes participants 302 at a table 304. In addition, the location shown in FIG. 3 includes a physical user collaborative area 306, such as a whiteboard on which a user can input markings using a pen. In FIG. 3, four markers 308 are provided at the corners of the physical user collaborative area 306, which is generally rectangular in shape. To distinguish between the different markers 308, light signals from the different markers 308 can encode different information. In examples where the markers 308 are light emitters, each of the light emitters can transmit a light signal that contains an encoded digital code, where the digital code can be amplitude modulated onto the light signal, phase modulated onto the light signal, and so forth. Digital codes contained in the light signals emitted by the different light emitters can be different from one another.

In further examples, where the markers 308 are light reflectors, the different light reflectors can include different patterns on the reflective surfaces of the light reflectors, such that the light signals reflected from the different light reflectors would provide different patterns of reflected signals. The different patterns of reflected signals provide the different information that allows the markers 308 to be distinguished from one another.

The user collaborative area focus module 122 is able to detect the different information encoded into the light signals, as received by an optical sensor 310 and communicated to the user collaborative area focus module 122. An image of the markers 308 captured by the optical sensor 310 includes sub-images of the markers 308. The user collaborative area focus module 122 is able to distinguish between the different markers 308 using the different encoded information. Based on distinguishing between the different markers, the user collaborative area focus module 122 is able to determine the boundary of the physical user collaborative area 306. By being able to distinguish between the different markers, the user collaborative area focus module 122 is able to determine that a first marker corresponds to a first point on the boundary of the physical user collaborative area 306, that a second marker corresponds to a second point on the boundary of physical user collaborative area 306, and so forth. From these points on the boundary, the user collaborative area focus module 122 is able to derive the boundary of the physical user collaborative area 306.

Although FIG. 1 and FIG. 3 show just one optical sensor 116 or 310 to sense light from marker(s), it is noted that in other examples, there can be multiple optical sensors 116 or 310 to sense light from the marker(s).

In some examples, the determination of the boundary of the physical user collaborative area 120 is performed without any user input to trigger the determining of the boundary of the physical user collaborative area 120. In other words, the user collaborative area focus module 122 is able to determine the boundary of the physical user collaborative area 120 without a user having to manually participate in the process of determining this boundary, such as by activating a button, inputting a command, and so forth.

In other examples, a user can trigger the determination of the boundary of the physical user collaborative area 120, such as by waving a digital pen or other input device in front of the physical user collaborative area 120, by inputting a command, by activating a button, and so forth.

In addition to use of the marker 118 or markers 308 of FIGS. 1 and 3, respectively, the user collaborative area focus module 122 can additionally perform image processing of an image of the physical user collaborative area 120 or 306, as captured by a camera, to identify a texture of a surface that corresponds to the physical user collaborative area 120 or 306. For example, the user collaborative area focus module 122 can look for an area that is smooth and that is representative of a surface on which a user marking can be made, such as a paper surface, a plastic surface, a chalkboard surface, and so forth.

It is noted that after the boundary of the physical user collaborative area (120 or 306) has been determined by the user collaborative area focus module 122, the location and the boundary of the area 120 or 306 can be saved into a profile. A "profile" can refer to any information that can be stored, such as by the user collaborative area focus module 122. After the location and boundary of the physical user collaborative area is saved into the profile, the marker 118 or the markers 308 can be removed, since the user collaborative area focus module 122 can use the saved profile to determine the location and boundary of the physical user collaborative area 120 or 306 for a subsequent video conference session that includes the location where the physical user collaborative area 120 or 306 is located.

Figure 4:
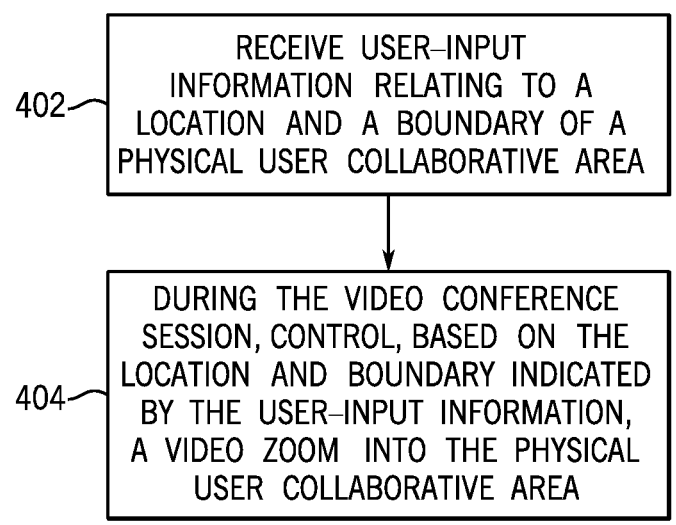
FIG. 4 is a flow diagram of a process according to alternative examples.

FIG. 4 is a flow diagram of an example process according to further implementations. In FIG. 4, markers such as the marker 118 of FIG. 1 or the markers 308 of FIG. 3 is (are) not used. Rather, instead of relying on markers that emit or reflect light, user-input information can be used to determine a location and boundary of a physical user collaborative area. The process of FIG. 4 can be performed by the user collaborative area focus module 122, for example.

The process of FIG. 4 includes receiving (at 402) user-input information relating to a location in a boundary of the physical user collaborative area to receive user-input marks during a video conference session. The location and boundary of the physical user collaborative area can be indicated using angle information, which specifies an angle between a camera and the physical user collaborative area, and coordinates of a location that corresponds to the physical user collaborative area. The user-input information can indicate the location and boundary of the physical user collaborative area that is within a field of view of a camera that captures video during the video conference session.

The process of FIG. 4 further includes, during the video conference session, controlling (at 404), based on the location and the boundary indicated by the user-input information, a video zoom into the physical user collaborative area.

Figure 5:
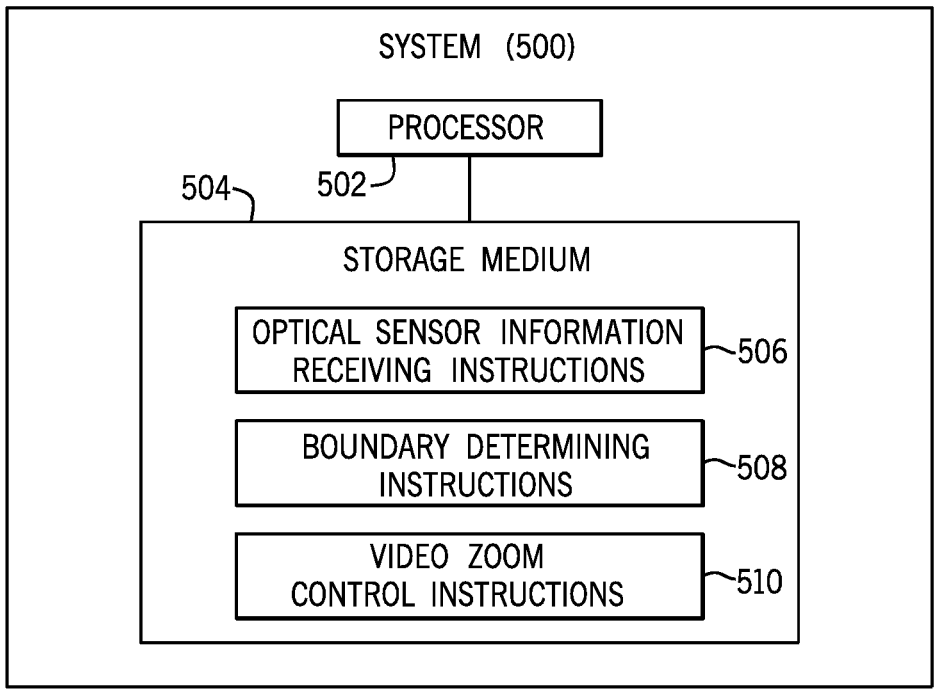
FIG. 5 is a block diagram of a system according to some examples.

FIG. 5 is a block diagram of a system 500 according to some examples. The system 500 can be implemented as a computer or an arrangement of computers. The system 500 includes a processor 502 (or multiple processors), and a non-transitory machine-readable or computer-readable storage medium storing machine-readable instructions executable on the processor 502 to perform various tasks. A processor can include a microprocessor, a core of a multi-core microprocessor, a microcontroller, a programmable integrated circuit, a programmable gate array, or another hardware processing circuit.

Instructions executable on a processor can refer to instructions executable on one processor or on multiple processors. The machine-readable instructions include optical sensor information receiving instructions 506 to receive information sensed by an optical sensor responsive to light from a marker arranged to indicate a boundary of a physical user collaborative area, where the marker is distinct from the physical user collaborative area. The machine-readable instructions further include boundary determining instructions 508 to determine, based on the received information, the boundary of the physical user collaborative area. In addition, the machine-readable instructions include video zoom control instructions 510 to control, based on the determined boundary, a video zoom into the physical user collaborative area during the video conference session.

Figure 6:
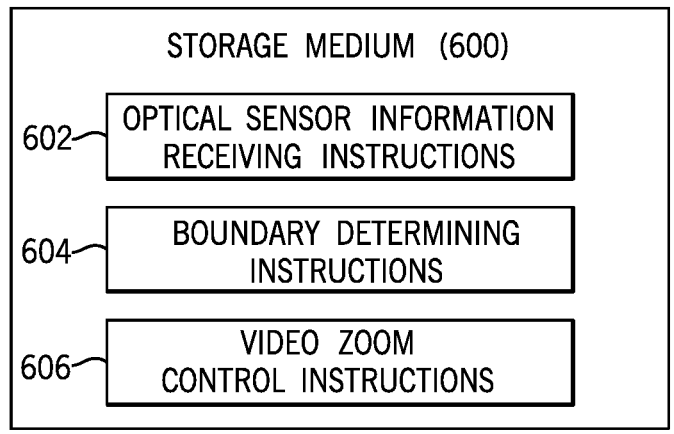
FIG. 6 is a block diagram of a storage medium storing machine-readable instructions according to some examples.

FIG. 6 is a block diagram of a non-transitory machine-readable or computer-readable storage medium 600 that stores machine-readable instructions that upon execution cause a system to perform various tasks. The machine-readable instructions of FIG. 6 are performed during a video conference session involving participants at a plurality of locations. The machine-readable instructions of FIG. 6 include optical sensor information receiving instructions 602 to receive information sensed by an optical sensor at a first location, where the received information is responsive to light from a marker arranged to indicate a boundary of a physical user collaborative area. The machine-readable instructions of FIG. 6 further include boundary determining instructions 604 to control, in a video displayed by a video conference equipment at a second location of the plurality of locations, a video zoom into the physical user collaborative area, based on the determined boundary.

The storage medium 504 or 600 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A system comprising:
a processor; and
a non-transitory storage medium storing instructions executable on the processor to:
receive information sensed by an optical sensor responsive to light from a plurality of markers positioned at different locations of a boundary of a physical user collaborative area to receive user-input marks at a first participant location during a video conference session, wherein the plurality of markers are distinct from the physical user collaborative area;
based on the received information indicating the different locations of the boundary and further based on analyzing a smoothness of the physical user collaborative area in an image of the physical user collaborative area captured by a camera, determine the boundary of the physical user collaborative area;
control, based on the determined boundary, a video zoom into the physical user collaborative area during the video conference session;
save information of the determined boundary of the physical user collaborative area into a profile; and
for a subsequent video conference session involving participants at participant locations including the first participant location, access the profile to determine the boundary of the physical user collaborative area at the first participant location.

2. The system of claim 1, wherein the received information comprises information sensed by a plurality of optical sensors responsive to the light from the plurality of markers.

3. The system of claim 1, wherein the received information is responsive to the light from the plurality of markers positioned at different corners of the boundary of the physical user collaborative area.

4. The system of claim 3, wherein the boundary of the physical user collaborative area is a rectangular boundary, and the determining of the boundary is based on the received information indicating corners of a rectangle.

5. The system of claim 1, wherein a first light from a first marker of the plurality of markers is encoded with first information, and a second light from a second marker of the plurality of markers is encoded with second information different from the first information, and wherein the instructions are executable on the processor to:
distinguish between the plurality of markers based on the first and second information,
wherein the determining of the boundary is based on the distinguishing between the plurality of markers including the first marker positioned at a first location of the boundary, and the second marker positioned at a second location of the boundary.

6. The system of claim 5, wherein the plurality of markers comprise a plurality of light emitters that transmit different digital codes, the different digital codes comprising the first and second information,
wherein the distinguishing between the plurality of markers is based on the different digital codes.

7. The system of claim 1, wherein the plurality of markers comprise a plurality of light emitters, and the received information corresponds to light emitted from the plurality of light emitters as sensed by the optical sensor.

8. The system of claim 1, wherein the plurality of markers comprise a plurality of light reflectors, and the received information corresponds to reflected light from the plurality of light reflectors as sensed by the optical sensor.

9. The system of claim 1, wherein the instructions are executable on the processor to determine, based on the received information, the boundary of the physical user collaborative area without any user input to trigger the determining of the boundary of the physical user collaborative area.

10. A system comprising:
a processor; and
a non-transitory storage medium storing instructions executable on the processor to:
receive information sensed by an optical sensor responsive to light from a marker arranged to indicate a boundary of a physical user collaborative area to receive user-input marks at a first location during a video conference session, wherein the marker is distinct from the physical user collaborative area;
determine, based on the received information and further based on analyzing a smoothness of the physical user collaborative area in an image of the physical user collaborative area captured by a camera, the boundary of the physical user collaborative area;
control, based on the determined boundary, a video zoom into the physical user collaborative area during the video conference session;
save information of the determined boundary of the physical user collaborative area into a profile; and
for a subsequent video conference session involving participants at locations including the first location, access the profile to determine the boundary of the physical user collaborative area at the first location.

11. The system of claim 10, wherein the received information sensed by the optical sensor is responsive to light from a plurality of markers placed at corners of the boundary of the physical user collaborative area, and wherein the determining of the boundary of the physical user collaborative area is based on identifying the corners of the boundary of the physical user collaborative area based on the received information.

12. The system of claim 11, wherein the boundary of the physical user collaborative area is a rectangular boundary, and the determining of the boundary is based on the received information indicating corners of a rectangle.

13. A non-transitory machine-readable storage medium comprising instructions that upon execution cause a system to:
   during a video conference session involving participants at a plurality of locations:
      receive information sensed by an optical sensor at a first location of the plurality of locations, the received information responsive to light from a plurality of markers positioned at different points of a boundary of a physical user collaborative area to receive user-input marks at the first location, wherein the plurality of markers are distinct from the physical user collaborative area,
      based on the received information indicating the different points of the boundary, determine the boundary of the physical user collaborative area,
      control, in a video displayed by a video conference equipment at a second location of the plurality of locations, a video zoom into the physical user collaborative area, based on the determined boundary, and
      save information relating to a location and the determined boundary of the physical user collaborative area into a profile; and
   for a subsequent video conference session involving participants at locations including the first location, access the profile to determine the location of the physical user collaborative area and the boundary of the physical user collaborative area at the first location.

14. The non-transitory machine-readable storage medium of claim 13, wherein the received information is responsive to light from the plurality of markers positioned at different corners of the boundary of the physical user collaborative area.

15. The non-transitory machine-readable storage medium of claim 13, wherein the plurality of markers comprise a plurality of light emitters that transmit light signals encoded with different information, and wherein the instructions upon execution cause the system to:
   determine the boundary based on the different information encoded in the transmitted light signals.

16. The non-transitory machine-readable storage medium of claim 13, wherein the received information is responsive to light from the plurality of markers positioned at different corners of the boundary of the physical user collaborative area, and wherein the determining of the boundary of the physical user collaborative area is based on identifying the corners of the boundary of the physical user collaborative area based on the received information.

17. The non-transitory machine-readable storage medium of claim 16, wherein the boundary of the physical user collaborative area is a rectangular boundary, and the determining of the boundary is based on the received information indicating corners of a rectangle.

* * * * *